United States Patent [19]

Teraguchi et al.

[11] Patent Number: 5,665,419
[45] Date of Patent: Sep. 9, 1997

[54] METHOD OF PRODUCING MEAT-LIKE PROTEIN FOODS

[75] Inventors: Taiji Teraguchi, Chigasaki; Koji Tsuchikawa, Yokohama; Yuzo Ikuta, Yokosuka, all of Japan

[73] Assignee: The Nisshin Oil Mills, Ltd., Japan

[21] Appl. No.: 475,327

[22] Filed: Jun. 7, 1995

Related U.S. Application Data

[62] Division of Ser. No. 264,154, Jun. 22, 1994.

[30] Foreign Application Priority Data

Jun. 28, 1993 [JP] Japan .................. 5-157010

[51] Int. Cl.$^6$ .................. A23J 3/16; A23J 3/22
[52] U.S. Cl. .................. 426/656; 426/516; 426/517; 426/634
[58] Field of Search .................. 426/656, 517, 426/105, 249, 274, 574, 634, 512, 518–520, 516

[56] References Cited

U.S. PATENT DOCUMENTS

| | | |
|---|---|---|
| 3,973,044 | 8/1976 | Giddey et al. ................ 426/656 |
| 4,076,846 | 2/1978 | Nakatsuka et al. ............ 426/656 |
| 4,125,630 | 11/1978 | Orthoefer ................... 426/656 |
| 4,883,421 | 11/1989 | Morgan ..................... 425/135 |

*Primary Examiner*—Anthony J. Weier
*Attorney, Agent, or Firm*—Bacon & Thomas

[57] ABSTRACT

A material consisting mainly of protein and water is supplied into an extruder through a supply port, mixed by screws and extruded from an extrusion port. The extrusion port is provided with a die including a plate having a plurality of holes. A mixture extruded from the extrusion port is provided with a fibrous orientation. The die has a cooling mechanism for cooling the mixture extruded from the extruder. The obtained protein material is heated and compression-molded by a pressing machine, and a protein food having a meat-like texture and mouth feeling is produced. Thus, a high-protein, low-calorie protein food having a meat-like complex texture and mouth feeling can be produced by a simple process.

4 Claims, 2 Drawing Sheets

METHOD OF PRODUCING MEAT-LIKE PROTEIN FOODS

This application is a Division of application Ser. No. 08/264,154, filed Jun. 22, 1994.

BACKGROUND OF THE INVENTION

1. Field of the Invention

The present invention relates generally to a method of producing novel foods, and more particularly to a method of producing, by using vegetable protein, meat-like protein foods having textures and mouth feeling similar to those of meats.

2. Description of the Related Art

There have been various conventional methods of producing meat-like protein foods by using vegetable protein, in particular, soybean protein, to which extrusion cooking techniques are applied.

For example, methods of producing protein foods, which are characterized by controlling the ratio of materials to be supplied into an extruder, are disclosed in Jap. Pat. Appln. KOKAI Publication No. 64-30543 ("method of producing a textured soybean protein"), Jap. Pat. Appln. KOKAI Publication No. 63-14663("method of producing meat-like fibrous foods"), and Jap. Pat. Appln. KOKOKU Publication No. 2-26950 ("extruded protein product").

A method of producing protein foods, which is characterized by driving an extruder under specified conditions, is disclosed, for example, in Jap. Pat. Appln. KOKOKU Publication No. 3-11749.

A method of producing protein foods, wherein materials are subjected to an extrusion process to have a relatively high water content, is disclosed, for example, in Jap. Pat. Appln. KOKOKU Publication No. 51-12695 ("flavorous meat-like protein") and Jap. Pat. Appln. KOKOKU Publication No. 62-34375 ("method of producing meat-like soft vegetable protein materials").

The protein foods produced by these methods, however, do not have textures and tastes of meats. In order to solve this problem, Jap. Pat. Appln. KOKAI Publication No. 4-228037 ("method of producing food material") discloses a method of producing food materials, wherein orientation of fibers similar to meats is obtained.

According to the method of Jap. Pat. Appln. KOKAI Publication No. 4-228037, at first, a material consisting substantially of soybean protein and water is supplied into an extruder and subjected to an extrusion process. Water is added to the resultant fiber-textured soybean protein with a relatively low water content (hereinafter referred to as "low water content TSP"), thereby swelling the low water content TSP. While the low water content TSP is being swelled, it is washed several times and loosen. Thus, a fibrous water-containing matter is obtained. The fibrous water-containing matter is pressurized and dehydrated, thereby producing a lump-like fibrous matter with fibrous orientation perpendicular to the direction of applied pressure. The lump-like fibrous matter is heated while it is pressurized. Thereby, the fibrous matter is solidified and a food material having meat-like fibrous orientation is obtained.

However, the thus produced food material does not have delicate texture and taste similar to meats.

Moreover, in a secondary process, water is added to the low water content TSP obtained by the extrusion process, and the low water content TSP is washed repeatedly and loosen to such a degree that its original shape is lost. In order to obtain meat-like complex texture orientation, the resultant matter is dehydrated. Then, in order to fix the texture orientation, the resultant matter is heated. Accordingly, the manufacturing process of the food materials is complex and time-consuming.

SUMMARY OF THE INVENTION

The object of the present invention is to provide a method of producing meat-like protein foods, whereby high-protein, low-calorie protein foods having complex textures and tastes similar to meats can be produced in simple steps.

In order to achieve this object, there is provided a method of producing a meat-like protein food, comprising the steps of:

mixing water and a material containing at least protein in a mixing container while heating and pressurizing the water and the material, thus obtaining a mixture, the amount of water being controlled such that a water-content in the mixture is set at 30 to 70 parts by weight in relation to 100 parts by weight of the protein-containing material;

cooling the mixture obtained in the mixing step, providing an orientation to the mixture, and extruding the mixture from the mixture container, thus obtaining a protein material; and compression-molding the protein material while heating the same.

There is also provided a method of producing a meat-like protein food, comprising the steps of:

mixing water and a material containing at least protein in a mixing container while heating and pressurizing the water and the material, thus obtaining a mixture, the amount of water being controlled such that a water content in the mixture is set at 30 to 70 parts by weight in relation to 100 parts by weight of the protein-containing material;

cooling the mixture obtained in the mixing step, providing an orientation to the mixture, and extruding the mixture from the mixture container, thus obtaining a protein material;

controlling the water content and shape of the protein material; and compression-molding the resultant protein material while heating the same.

An extruder used as the mixing container in the method of the present invention has a die at an extrusion port thereof. The die has a cooling mechanism for cooling the die and a plate having a number of holes to obtain an extruded mixture having an orientation.

When a meat-like protein food is produced by using the extruder having the above structure, a material consisting substantially of protein and water is supplied into the extruder. The material and water is heated, pressurized and mixed by the extruder. The mixture is extruded from the extruder through the die. The mixture passing through the die is cooled by the cooling mechanism. When the cooled mixture is passed through the holes in the plate, the mixture is provided with an orientation. Thereby, a protein material having a fibrous orientation is produced.

The protein material extruded from the extruder is supplied to the pressing machine and compressed while being heated. Thereby a meat-like protein food having a meat-like texture and mouth feeling is produced.

The amount of water supplied to the extruder is controlled such that the water content in the protein material extruded from the extruder is 30 to 70 parts by weight in relation to 100 parts by weight of the protein material.

The protein material extruded from the extruder may be heated and compression-molded after the water content and shape thereof have been controlled. In this case, a meat-like protein food having a desired texture and mouth feeling can be obtained.

As has been described above, according to the method of producing a meat-like protein food of the present invention, the die having the cooling mechanism and plate with holes is provided at the extrusion port of the extruder. Thus, the high water content TSP taken out of the extruder possesses a meat-like complex fibrous orientation and a properly controlled water content. Accordingly, only by heating and compression-molding the high water content TSP and fixing the texture of the TSP, a protein food having a meat-like texture and mouth feeling is produced in simple steps. In addition, a protein food having a more complex meat-like texture and mouth feeling can be produced by controlling the water content and shape of the high water content TSP extruded from the extruder and then heating and compression-molding the TSP.

Moreover, according to the present invention, since the meat-like protein food can be produced from vegetable protein such as soybean protein, a high-protein, low-calorie protein food can be produced, as compared to meats.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

A method of producing meat-like protein foods according to an embodiment of the present invention will now be described with reference to the accompanying drawings.

At first, the structure of a twin-screw extruder serving as a mixing container, which is used in a method of producing meat-like protein foods according to this invention, will now be described.

Figure 1:
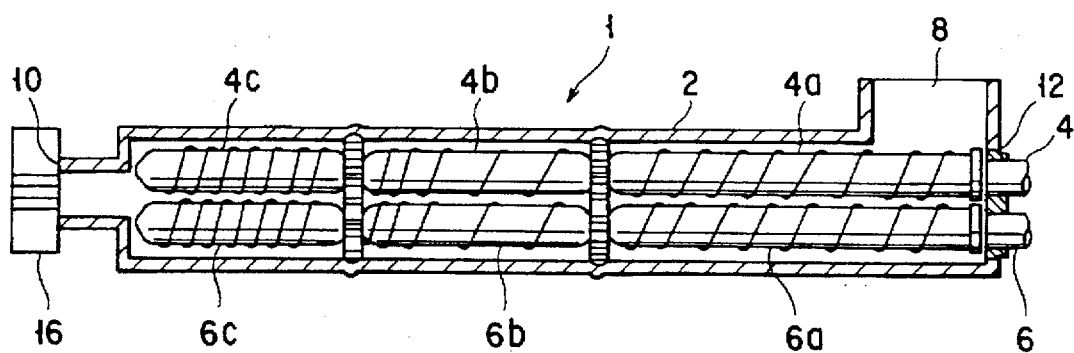
FIG. 1 is a cross-sectional view showing an extruder used in a method of producing meat-like protein foods according to the present invention.

As is shown in FIG. 1, a twin-screw extruder 1 has a housing 2 including screws 4 and 6. The housing 2 is formed in a pipe structure and has a supply port 8 for supplying a material and water into the housing 2, an extrusion port 10 for extruding a mixture of the material and water out of the housing 2, and a connection port 12 for connection with a driving apparatus (not shown) for driving the screws 4 and 6. The screws 4 and 6 comprise, respectively, three portions 4a, 4b and 4c and three portions 6a, 6b and 6c. The screw portions 4c and 6c are rotatable in the same direction as or in the opposite direction to the other screws portions 4a, 4b, 6a and 6b. Normally the screw portions 4c and 6c rotate in the same direction as the other screw portions. The extrusion port 10 is provided with a die 16 for providing fibrous orientation to the mixture and cooling the mixture.

Figure 2:
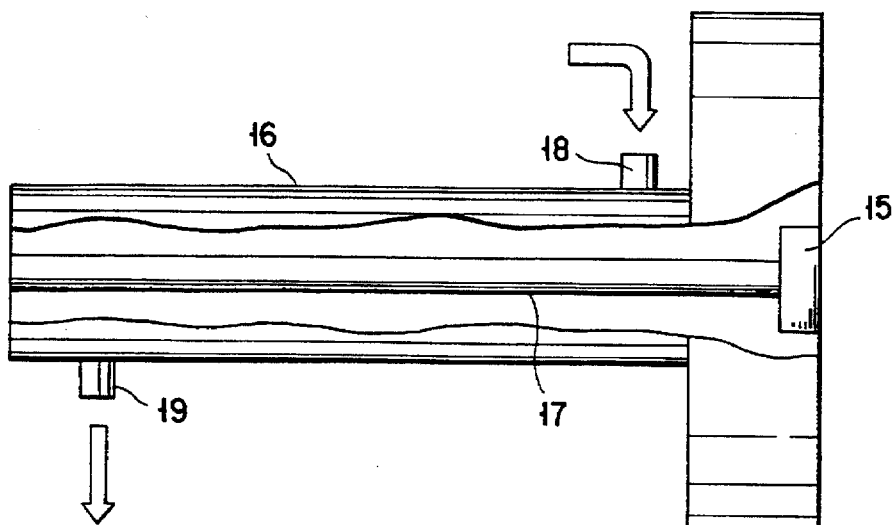
FIG. 2 shows a die provided on the extruder.
Figure 3:
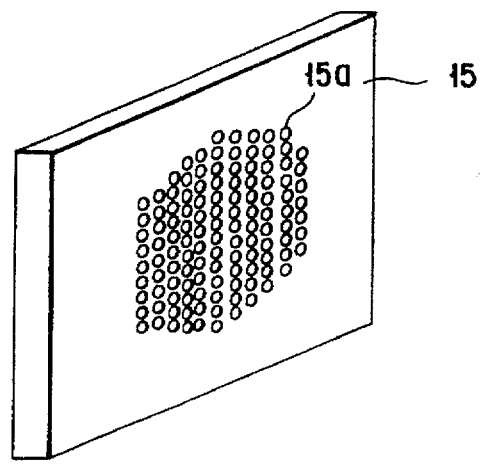
FIG. 3 shows a plate of the die.

As is shown in FIG. 2, the die 16 includes a passage 17 for guiding the mixture produced in the extruder 1 to the outside. A cooling mechanism for cooing the mixture passing through the passage 17 is provided around the passage 17. The cooling mechanism includes an inlet 18, through which cooling water is supplied into the die 16, and an exhaust port 19 through which the cooling water circulated around the passage 17 is exhausted to the outside. A plate 15 is provided on an extruder-(1)-side end portion of the passage 17 in a direction substantially perpendicular to the direction of passage of the mixture. The plate 15 is formed in a flat plate having a plurality of holes 15a, as shown in FIG. 3.

A method of producing meat-like protein foods by using the extruder 1 having the above structure will now be described.

The driving conditions of the extruder 1 are as follows. The barrel temperature in the extruder 1 is set at, preferably, 120° to 250° C., and more preferably 140° to 190° C. The barrel pressure within the extruder 1 near the die 16 is set at, preferably, 10 to 100 kg/cm$^2$, and more preferably 15 to 80 kg/cm$^2$.

A material supplied from the supply port 8 of the extruder 1 consists mainly of protein obtained from oil-stuff seeds, grains, etc., in particular, soybean protein. At least 50 parts by weight of soybean protein is included with respect to 100 parts by weight of the material. The material further includes starch, egg white, collagen, mannan, sugar ester, etc. By varying the mixing ratio of these components, the taste of obtained protein foods can be controlled.

Preferably 20 to 60 parts by weight, or more preferably, 25 to 50 parts by weight of water in relation to 100 parts by weight of the material is supplied into the supply port 8 along with the material by a constant feeder, etc.

The material and water is supplied from the supply port 8 of the extruder 1, and the screws 4 and 6 are rotated. Thus, the material and water is guided into the extruder 1. The material and water guided into the extruder 1 is heated by a heating mechanism (not shown) and pressurized by a pressurizing mechanism (not shown). The pressurized and heated mass is passed through the screw portions 4a and 6a, 4b and 6b, and 4c and 6c successively and stirred and mixed. The mixture of the material and water guided through the screws 4 and 6 is extruded out of the extruder 1 via the die 16 by the extrusion force produced by the rotation of the screws 4 and 6.

The mixture guided to the die 16 passes through the holes 15a in the plate 15 and is cooled by the cooling mechanism provided in the die 16. Thus, the mixture is provided with fibrous orientation in the direction extrusion and is taken out of the extruder 1. A textured soybean protein or a protein material taken out of the extruder 1 has a relatively high water content (hereinafter this textured soybean protein is referred to as "high water content TSP").

The high water content TSP thus obtained should preferably contain 30 to 70 parts by weight of water in relation to 100 parts by weight of the high water content TSP, and it is controlled to have a relatively high water content. The amount of water supplied to the extruder 1 is controlled to fall within this range of water content of the high water content TSP. If the water content in the high water content TSP taken out from the extruder 1 is less than 30 parts by weight in relation to 100 parts by weight of the high water content TSP, the fluidity of the high water content TSP at the extrusion port 10 of extruder 1 is degraded, and the pressure within the extruder 1 rises. In the worst case, the operation of the extruder 1 is disabled. If the water content of the high water content TSP exceeds 70 parts by weight in relation to 100 parts by weight of the high water content TSP, the orientation of fibers of the high water content TSP taken out of the extruder 1 deteriorates, and a protein food (described later) obtained from the high water content TSP loses appropriate consistency.

The high water content TSP taken out of the extruder 1 is compressed, while being heated, by a pressing machine (FIG. 6), into a so-called meat-like protein food having a texture, fibrous orientation and mouth feeling similar to those of meats.

The shapes of the die 16 and plate 15 are various changed to provide desired fibrous orientation to the high water content TSP, and the high water content TSP is formed in a sheet-like shape, cylindrical shape or prism shape, thereby controlling the mouth feeling of the protein food. Two or more kinds of high water content TSPs having different fibrous orientations and textures may be mixed or laminated, and then heated and compressed into a protein food having a complex texture and a mouth feeling similar to those of meats. Moreover, a plurality of sheets of high water content TSPs may be laminated with their fibrous orientations made to coincide, and then heated and compressed by a pressing machine to obtain a protein food having a very strong fibrous orientation similar to the fibrous orientation of meats.

Next, a description will be given of a process of producing a protein food having a desired texture and mouth feeling, by controlling the water content or shape of the high water content TSP taken out of the extruder 1 and then heating, compressing and forming the resultant.

At first, when the water content of the high water content TSP taken out of the extruder 1 is controlled, hot water or water is added to the high water content TSP to swell the same, so that the water content in the high water content TSP falls preferably within 35 to 85 parts by weight, and more preferably 40 to 75 parts by weight in relation to 100 parts by weight of the high water content TSP. The resultant is heated, compressed and formed by the pressing machine. At this time, a liquid containing a seasoning or a flavor or a liquid containing a quality-improving agent such as a binding agent may be mixed in the hot water or water, thereby to improve the flavor or taste of the obtained protein food. In addition, by controlling the water content prior to the thermal compression molding process in this manner, the texture (in particular, the feeling in swallowing the chewed food, and the melting in the mouth) of the protein food can be improved. For example, by using a liquid containing 5 parts by weight of collagen liquid and 1 part by weight of 65 chicken paste in relation to 100 parts by weight of water, the water content in the high water content TSP is controlled to 60 parts by weight relative to 100 parts by weight of the high water content TSP. Then, the resultant is heated and compression-molded by the pressing machine. Thus, a protein food having poultry skin-like texture and mouth feeling is obtained.

Furthermore, the high water content TSP may cut into, e.g. rods, strips or cubes by a food cutter or a knife, and then the resultant is heated and compression-molded by the pressing machine. Thus, the texture and mouth feeling of the protein food can be further improved.

Accordingly, by controlling the water content and shape of the high water content TSP prior to the thermal compression molding process, protein foods with various textures and mouth feeling can be produced.

Examples of protein foods having complex textures, which are produced by laminating various high water content TSPs with variously controlled water contents and shapes, will now be described.

Figure 4:
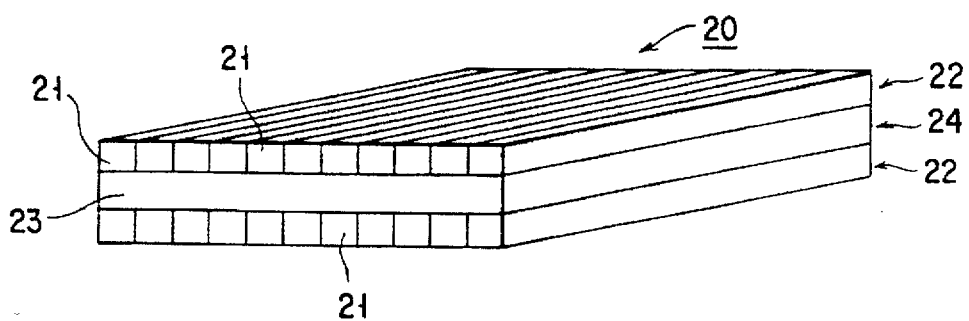
FIG. 4 schematically shows an embodiment of a laminated matter in which different kinds of high water content TSPs produced by the extruder shown in FIG. 1 are laminated.

As is shown in FIG. 4, two kinds of sheet materials 22 and 24 with different textures are prepared. The sheet material 22 is formed in the following manner. For example, a decomposed amino acid liquid is added to a prism-shaped high water content TSP 21 extruded from the extruder 1. Water is added until the water content in the resultant reaches 55 parts by weight relative to 100 parts by weight of the high water content TSP 21. The shape of the TSP 21 is determined by cutting the TSP 21 into pieces having a length of about 10 mm by means of a cutter. The resultant high water content TSP pieces 21 are arranged in parallel. The other sheet material 24 is produced in the following manner. A liquid containing a fat-based meat flavor is added to a sheet-like high water content TSP 23 extruded from the extruder 1. Water is added until the water content in the resultant reaches 60 parts by weight relative to 100 parts by weight of the high water content TSP 23. The resultant is shaped in a rectangular plate of the size, 7 mm (thickness)×40 mm (width)×100 mm (length). The sheet material 24 is interposed between two sheet materials 22, thereby forming a lamination 20.

Figure 5:
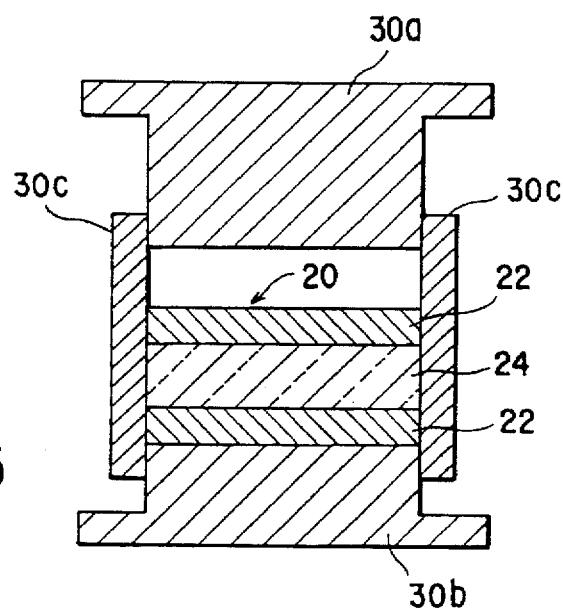
FIG. 5 is a cross-sectional view showing the state in which a protein material taken out from the extruder is filled in a mold.

As is shown in FIG. 5, the lamination 20 is put in a mold 30. The mold 30c comprises first and second portions 30a and 30b having rectangular pressing surfaces of substantially the same size as lamination surfaces of the sheet materials 22 (24), and a tube-like third portion 30c having an inside cross section of substantially the same dimensions as the pressing surfaces. The first and second portions 30a and 30b are inserted into the third portion 30c such that the edge portions of the rectangular pressing surfaces of the first and second portions 30a and 30b come into contact with the inner walls of the third portion 30c. The space defined by the first, second and third portions is sealed so that vapor may not escape in the heating step.

Figure 6:
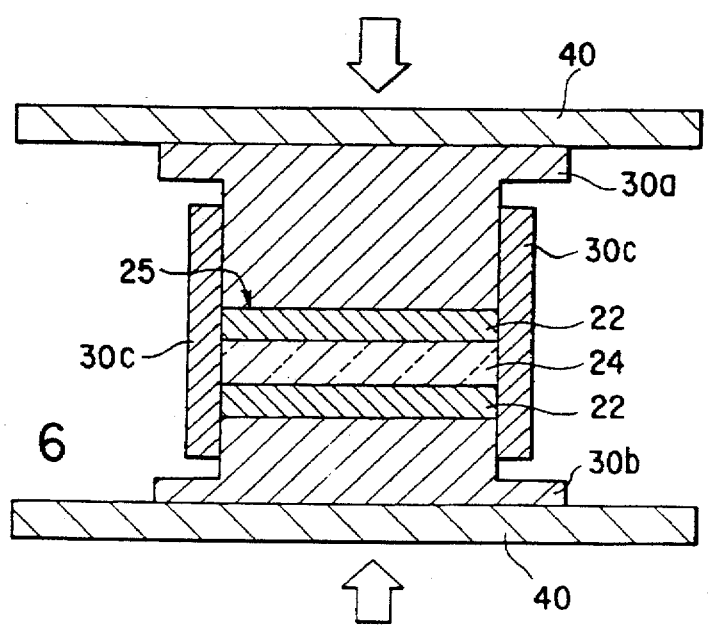
FIG. 6 is a cross-sectional view showing a pressing machine in which the mold filled with the protein material, as shown in FIG. 5, is provided.

The mold 30 filled with the lamination 20 is situated in a pressing machine 40 as shown in FIG. 6. The internal temperature of the pressing machine 40 is set at preferably 50° to 160° C., and more preferably 80° to 150° C. The internal pressure in the pressing machine 40 is set at preferably 5 to 80 kg/cm$^2$ and more preferably 10 to 60 kg/cm$^2$. The duration of driving (i.e. duration of pressurization) of the pressing machine 40 is set a time period needed for heat to reach a central portion of the lamination 20. If the internal temperature is too high, the protein melts and the fibrous property and orientation of the high water content TSP may deteriorate.

The inside of the pressing machine 40 is sealed so as to prevent evaporation of water, thereby keeping the water content of the lamination 20. At the time of pressurization, a seasoning or a flavor is easily permeated into or adsorbed on the lamination 20.

The pressing machine is actuated in the direction of arrows (FIG. 6) and the lamination 20 placed therein is compressed in the direction of lamination. As a result, a protein food 25 is produced. The fibrous orientation of the produced protein food 25 does not depend on the direction of pressing (i.e. direction of lamination), but on the fibrous orientation of the sheet materials 22 and 24 per se.

The texture and mouth feeling of the protein food 25 may be controlled more widely by mixing in the protein food 25 a material of different mouth feeling such as a binding agent (e.g. egg white and mannan) or a fat substitute.

After the protein food 25 has been manufactured, the temperature and pressure in the pressing machine 40 are gradually lowered while the machine 40 is being sealed. Specifically, the temperature of the protein food 25 is lowered to 80° C. or below (preferably room temperature) and the pressure is to an atmospheric pressure. The protein food 25 is taken out of the pressing machine 40.

If necessary, a seasoning or a flavor is added to the protein food 25 and the food 25 is cooked, for example, as a fry, a cutlet, a fry without coating, etc. Such cooked protein food 25 keeps the fibrous orientation provided at the time of manufacture of the high water content TSP and has complex texture and mouth feeling similar to those of meats.

Specific examples of cooking of protein foods according to the method of the present invention will now be described.

[Cooking Example 1]

Materials (parts by weight): soy protein isolate 8; defatted soybean meal 3; wheat gluten 1.5; corn starch 1.5; sugar ester 0.04; pork extract 0.7; amino acid seasoning liquid 0.1; salt 0.07; and edible oil 0.5.

These materials were uniformly mixed by a ribbon mixer and supplied into a twin-screw extruder by a constant feeder at a rate of 10 kg per hour. Water was supplied into the extruder at a rate of 10 l per hour.

The conditions for driving the extruder were set as follows: the barrel temperature near the extrusion port was 170° C., and the barrel pressure near the extrusion port was 40 kg/cm$^2$. The extrusion port of the extruder is provided with a die having a porous plate with 70 holes each having a diameter of 2 mm, as well as a cooling mechanism.

The mixture passing through the die was cooled by the cooling mechanism to about 80° to 90° C. The cooled mixture was passed through the plate and the resultant with fibrous properties and orientation was extruded from the extruder. The extruded high water content TSP was formed in a sheet shape of the size, 7 mm (thickness)×50 mm (width)×100 mm (length). This sheet-shaped TSP contained 55 parts by weight of water relative to 100 parts by weight of the TSP and possessed strong fibrous properties.

Four sheets of the high water content TSP were hermetically filled in the mold such that their fibrous directions were made to coincide. The mold was set in the pressing machine and heated and compression-molded at 120° C. and 25 kg/cm$^2$. Thus, a rectangular protein food 20 mm thick, 50 mm wide and 100 mm long was obtained.

The protein food was provided with coating and fried for 3 minutes at 170° C. into a cutlet-like dish. This cutlet-like dish possessed fibrous orientation, fibrous mouth feeling, meat-like mouth feeling, and appropriate toughness, like a pork cutlet.

[Cooking Example 2]

At first a rectangular piece was obtained.

Materials (parts by weight): soy protein isolate 8; defatted soybean meal 2; wheat gluten 1; corn starch 2; powder collagen 1.5; corn grits 1; sugar ester 0.04; amino acid seasoning liquid 0.05; edible oil 0.5; sodium glutamate 0.01.

These materials were uniformly mixed by a ribbon mixer and supplied into a twin-screw extruder by a constant feeder at a rate of 10 kg per hour. Water was supplied into the extruder at a rate of 6.5 l per hour.

The conditions for driving the extruder were set as follows: the barrel temperature near the extrusion port was 170° C., and the barrel pressure near the extrusion port was 35 kg/cm$^2$. The extrusion port of the extruder is provided with a die having a porous plate with 100 holes each having a diameter of 1 mm, as well as a cooling mechanism.

The mixture passing through the die was cooled by the cooling mechanism to about 80° to 90° C. The cooled mixture was passed through the plate and the resultant with fibrous properties and orientation was extruded from the extruder. The extruded high water content TSP was formed in a sheet shape of the size, 5 mm (thickness)×40 mm (width). This sheet-shaped TSP contained 40 parts by weight of water relative to 100 parts by weight of the TSP and possessed strong fibrous properties.

A liquid containing 10 parts by weight of chicken powder solution relative to 100 parts by weight of water was added to the obtained high water content TSP, so that the TSP contained 65 parts by weight of water relative to 100 parts by weight of the TSP. Then, the shape of the TSP was controlled and a rectangular piece of the size, 10 mm×10 mm×5 mm, was obtained.

In addition, a rod-like piece was obtained.

Materials (parts by weight): soy protein concentrate 8; soy protein isolate 3; defatted soybean meal 2; wheat gluten 1.5; corn starch 1.5; and freeze-dried yam flour 0.65.

These materials were uniformly mixed by a ribbon mixer and supplied into a twin-screw extruder by a constant feeder at a rate of 10 kg per hour. Water was supplied into the extruder at a rate of 4.5 l per hour.

The conditions for driving the extruder were set as follows: the barrel temperature near the extrusion port was 180° C., and the barrel pressure near the extrusion port was 45 kg/cm$^2$. The extrusion port of the extruder is provided with a die having a porous plate with 70 holes each having a diameter of 2 mm, as well as a cooling mechanism.

The mixture passing through the die was cooled by the cooling mechanism to about 80° to 90° C. The cooled mixture was passed through the plate and the resultant with fibrous properties and orientation was extruded from the extruder. The extruded high water content TSP contained 50 parts by weight of water relative to 100 parts by weight of the TSP and possessed strong fibrous properties. This TSP was formed in a rod shape of 5 mm (thickness)×5 mm (width).

Then, a binding agent was obtained by stirring and mixing the following materials: 2.5 parts by weight of dried egg white; 2.5 parts by weight of starch; 6.3 parts by weight of vegetable oil; 2.5 parts by weight of chicken extract; 0.3 part by weight of chicken flavor; and 9.8 parts by weight of water.

At first 25 parts by weight of the rod-like pieces was placed on the bottom of the mold. A mixture of 50 parts by weight of the rectangular pieces and 25 parts by weight of binding agent, which was obtained by the ribbon mixer, was placed on the rod-like pieces. Furthermore, 25 parts by weight of the rod-like pieces was placed on the mixture. The resultant lamination was heated and compression-molded by the pressing machine for 20 minutes at 110° C. and 10 kg/cm². The compression-molded lamination was cooled while being pressurized. After the temperature of the lamination was lowered to room temperature, the lamination was taken out of the pressing machine. Thus, a cylindrical protein food having a diameter of 40 mm and a thickness of 30 mm was obtained.

This protein food was covered with "karaage" flour (i.e. flour for frying without coating) and fried for two minutes at 170° C. The obtained dish was eaten and it was found that the dish possessed fibrous orientation, fibrous mouth feeling, meat-like mouth feeling, appropriate toughness, good melting in the mouth, and good feeling in swallowing, like flavorous chicken.

[Comparative Example]

A commercially available low water content fiber-textured soybean protein (hereinafter referred to as "low water content TSP"), which is shaped in a cylinder with a diameter of 20 mm and a length of 20 mm and contains 7 wt %, was put in a stirrer having stirring blades. The low water content TSP was stirred minutes 30 minutes along with hot water having a temperature of 80° C. and swollen. The swollen low water content TSP was further stirred and loosen to a size of about 20 mm. The cracked low water content TSP was put in a nylon mesh bag and lightly dehydrated. Then, again the resultant was put in the stirrer and washed with water twice. The washed low water content TSP was put in a mold and dehydrated under pressure of 15 kg/cm². The dehydrated low water content TSP was taken out of the mold and vacuum-packed in a casing of vinylidene chloride. The vacuum-packed TSP was put in a stainless-steel retainer and heated for 40 minutes at 120° C. and fixed. The fixed low water content TSP was cooled to room temperature and taken out of the retainer.

The thus obtained protein food was boiled well in a liquid containing chicken extract. Then, the protein food was covered with "karaage" flour and fried for two minutes at 170° C. The resultant dish was eaten, but it was found that this dish was inferior to the foods of Cooking Examples 1 and 2 in all respects, i.e. fibrous orientation, fibrous mouth feeling, appropriate toughness, etc.

According to the method of producing meat-like protein foods of the present invention, wherein the extruded high water content TSP is heated and compression-molded with or without control of water content and shape, protein foods having fibrous orientation, texture and mouth feeling similar to those of meats can be produced. The present invention is not limited to the above embodiments, and various modifications can be made without departing from the spirit of the invention. For example, protein foods having various mouth feeling similar to those of meats can be produced by varying the mixing ratio of materials, water content, temperature, pressure, shape, etc.

What is claimed is:

1. A food produced by a method of producing a meat-like protein food, the method comprising the steps of:

mixing water and a material containing soy protein isolate, defatted soybean meal, wheat gluten, corn starch, sugar ester, pork extract, amino acid seasoning liquid, salt, and edible oil, in an extruder having a die provided at an extrusion port thereof while heating and pressurizing the water and the material, thus obtaining a mixture, said die including a porous plate for providing an orientation to the mixture obtained in the mixing step, and a cooling mechanism for cooling the mixture provided with the orientation after passing the porous plate when the mixture is extruded from said extruder;

extruding said mixture obtained in the mixing step from said extruder via said die, providing an orientation to the mixture, and cooling the mixture, thus obtaining a sheet-like protein material;

preparing a plurality of said sheet-like protein materials and laminating the sheet-like protein materials with their directions of orientation made to coincide with each other;

compressing-molding the laminated protein materials obtained in said laminating step while heating the same, thus obtaining a protein food; and cooking the protein food;

whereby said food comprises protein fibers having an orientation in the direction of extrusion.

2. A food produced by a method of producing a meat-like protein food, the method comprising:

a first mixing step of mixing water and a first material containing soy protein isolate, defatted soybean meal, wheat gluten, corn starch, powder collagen, corn grits, sugar ester, amino acid seasoning liquid; edible oil, and sodium glutamate in an extruder having a die provided at an extrusion port thereof while heating and pressurizing the water and the first material, thus obtaining a first mixture, said die including a porous plate for providing an orientation to the first mixture obtained in the first mixing step, and a cooling mechanism for cooling the first mixture provided with the orientation after being passed through the porous plate, when the first mixture is extruded from said extruder;

extruding said first mixture obtained in the first mixing step from said extruder via said die, providing an orientation to the mixture, and cooling the first mixture, thus obtaining a sheet-like protein material;

a step of adding a liquid containing a chicken powder solution to said sheet-like protein material thereby controlling the water content of the sheet-like protein material;

a step of cutting the sheet-like protein material with the controlled water content into a plurality of rectangular pieces;

a second mixing step of mixing water and a second material containing soy protein concentrate, soy protein isolate, defatted soybean meal, wheat-gluten, corn starch, and freeze-dried yam flour, in said extruder having a die provided at an extrusion port thereof while heating and pressurizing the water and the second material, thus obtaining a second mixture;

a step of extruding said second mixture obtained in said second mixing step from said extruder via said die, providing an orientation to the second mixture, cooling the second mixture, thus obtaining a rod-like protein material;

a step of cutting said rod-like protein material at a predetermined length, thus obtaining rod-like pieces;

a step of obtaining a binding agent by stirring and mixing dried egg white, starch, vegetable oil, chicken extract, chicken flavor, and water;

arranging a first group of said rod-like pieces, placing a mixture of said rectangular pieces and said binding agent on said rod-like pieces, and arranging a second group of said rod-like pieces, thus laminating the protein materials;

compression-molding said laminated protein material while heating the same, thus obtaining a protein food; and cooking said protein food whereby said food comprises protein fibers having an orientation in the direction of extrusion.

3. A food produced by a method of producing a meat-like protein food, comprising the steps of:

mixing water and a material containing at least protein in an extruder having a die provided at an extrusion port thereof while heating and pressurizing the water and the material, thus obtaining a mixture, said die including a porous plate for providing an orientation to the mixture obtained in the mixing step, and a cooling mechanism for cooling the mixture provided with the orientation after being passed through the porous plate, when the mixture is extruded from said extruder;

extruding said mixture obtained in the mixing step from said extruder via said die, providing an orientation to the mixture, and cooling the mixture, thus obtaining a protein material, an amount of said water being controlled such that a water content in the protein material is set at 30 to 70 parts by weight in relation to 100 parts by weight of the protein material; and compression-molding the protein material while heating the same whereby said food comprises protein fiber having an orientation in the direction of extrusion.

4. A food produced by a method of producing a meat-like protein food comprising the steps of:

mixing water and a material containing at least protein in an extruder having a die provided at an extrusion port thereof while heating and pressurizing the water and the material, thus obtaining a mixture, said die including a porous plate for providing an orientation to the mixture obtained in the mixing step, and a cooling mechanism for cooling the mixture provided with the orientation after being passed through the porous plate, when the mixture is extruded from said extruder;

extruding said mixture obtained in the mixing step from said extruder via said die, providing an orientation to the mixture, and cooling the mixture, thus obtaining protein material, an amount of said water being controlled such that a water content in the protein material is set at 30 to 70 parts by weight in relation to 100 parts by weight of the protein material;

controlling the water content and shape of said protein material; and compression-molding the protein material obtained in the controlling step while heating the same whereby said food comprises protein fibers having an orientation in the direction of extrusion.

* * * * *